United States Patent
Guillaume et al.

(10) Patent No.: US 10,003,586 B2
(45) Date of Patent: Jun. 19, 2018

(54) METHOD AND DEVICE FOR GENERATING A SECRET KEY

(71) Applicant: Robert Bosch GmbH, Stuttgart (DE)

(72) Inventors: Rene Guillaume, Weil der Stadt (DE); Christopher Huth, Leonberg (DE)

(73) Assignee: ROBERT BOSCH GMBH, Stuttgart (DE)

(*) Notice: Subject to any disclaimer, the term of this patent is extended or adjusted under 35 U.S.C. 154(b) by 207 days.

(21) Appl. No.: 15/156,647

(22) Filed: May 17, 2016

(65) Prior Publication Data
US 2017/0012954 A1    Jan. 12, 2017

(30) Foreign Application Priority Data
Jun. 9, 2015    (DE) .................. 10 2015 210 537

(51) Int. Cl.
| | | |
|---|---|---|
| *H04L 9/00* | (2006.01) | |
| *H04L 29/06* | (2006.01) | |
| *H04L 9/08* | (2006.01) | |
| *H04L 29/08* | (2006.01) | |

(52) U.S. Cl.
CPC .......... *H04L 63/062* (2013.01); *H04L 9/0866* (2013.01); *H04L 63/0428* (2013.01); *H04L 67/10* (2013.01); *H04L 2209/34* (2013.01)

(58) Field of Classification Search
CPC ....................................... H04L 9/08
USPC .................. 380/44, 45, 46, 47, 259, 262
See application file for complete search history.

(56) References Cited

U.S. PATENT DOCUMENTS

| | | | |
|---|---|---|---|
| 7,942,324 B2 | 5/2011 | Chabanne | |
| 8,090,101 B2* | 1/2012 | Ye ........................ | H04L 63/061 380/44 |
| 2007/0058808 A1* | 3/2007 | Rudolf .................. | H04L 9/0841 380/44 |
| 2007/0177729 A1* | 8/2007 | Reznik .................... | H04K 1/00 380/44 |
| 2012/0159147 A1* | 6/2012 | Ando .................... | H04L 9/0875 713/150 |

* cited by examiner

*Primary Examiner* — Izunna Okeke
(74) *Attorney, Agent, or Firm* — Norton Rose Fulbright US LLP; Gerard Messina

(57) ABSTRACT

A method for generating a secret key via a reciprocal communication channel connecting a first communication node and a second communication node, wherein the first communication node obtains a first sample by a measurement of the communication channel, the first communication node performs a quantization of the first sample, the first communication node performs a matching of the quantized sample with the second communication node via the communication channel, during the matching, the first communication node obtains and quantizes a second sample by a second measurement of the communication channel and the communication nodes obtain the key from the samples by a privacy amplification.

9 Claims, 1 Drawing Sheet

METHOD AND DEVICE FOR GENERATING A SECRET KEY

CROSS REFERENCE

The present application claims the benefit under 35 U.S.C. § 119 of German Patent Application No. DE 102015210537.7 filed on Jun. 9, 2015, which is expressly incorporated herein by reference in its entirety.

FIELD

The present invention relates to a method for generating a secret key. The present invention furthermore relates to a corresponding device, to a corresponding computer program and to a corresponding storage medium.

BACKGROUND INFORMATION

A symmetric cryptosystem is a cryptosystem in which, in contrast to an asymmetric cryptosystem, all involved (legitimate) subscribers use the same key. The use of one and the same key for encrypting and decrypting data, for calculating and verifying message authentication codes, etc. requires that prior to every encrypted exchange the key itself must first be distributed. Since the security of the entire method depends on keeping the key secret, however, traditional approaches usually provide for keys to be exchanged via a secure channel. This may occur in particular by a manual introduction of the keys into the respective subscribers, for example by inputting a password, from which the key itself may then be derived.

The exchange of keys via insecure channels, by contrast, still represents a challenge for one skilled in the art, which is known in cryptography as the "key distribution problem." The related art offers approaches toward solving this problem such as the known Diffie-Hellman key exchange or so-called hybrid encryption methods, which allow for the exchange of symmetric keys by including asymmetric protocols.

Recently, however, cryptosystems are increasingly being discussed, which shift the problem of establishing the key from the application layer of the OSI reference model to its bit transmission layer (physical layer, PHY). Such approaches are implemented in the still new field of cyber-physical systems, which are characterized by the focused use of wireless and thus inherently insecure communication channels.

Corresponding methods provide for each of the subscribing parties to derive a key from the physical properties of the channel connecting them in such a way that the keys thus generated match without requiring a transmission of concrete parts of the key. U.S. Pat. No. 7,942,324 B1 describes such a method in exemplary fashion.

A weak point of such methods is their susceptibility to noise effects, interferences and other local disturbances. Deviations of the measuring times or measuring frequencies on the part of the subscribed nodes at times also impair the reciprocity of the channel. Such imponderables may require a time-consuming matching of the keys generated on both sides.

SUMMARY

The present invention provides a method for generating a secret key, a corresponding device, a corresponding computer program and a corresponding storage medium according to the independent claims.

One advantage of this approach lies in the fact that it includes an interactive matching that is more efficient with respect to its energy consumption, which is largely determined by the expended transmission energy.

For this purpose, according to the present invention, the additional communication expenditure caused by matching protocols is used for additional channel estimation, without excluding the actual channel measurement.

Ultimately, the measure of secret key material of the key generation protocol produced per transmitted message is increased and thus the total number of transmissions is reduced.

For this purpose, the measurement of the communication channel or of a property dependent on this channel is interleaved with the matching process. By utilizing the additional communication expenditure of matching protocols, it is possible to perform additional channel probing. Thus, at best, a designated channel measurement is no longer required, which is possibly not usable for other functionality.

Advantageous developments of the present invention include, for example, a provision for the first communication node to obtain and quantize additional samples via multiple iterations until a specified minimum number of samples is reached. The iterative design of this protocol makes it possible to calculate exactly whether another transmission-receiving step—as far as successfully generated key material is concerned—is necessary, which offers the possibility of saving energy by a reduced number of required transmissions.

According to another aspect, there may be a provision for the first communication node to encode an item of parity information of the respective sample in a first iteration following the quantization and to transmit the parity information via the communication channel to the second communication node. It is thus possible to calculate the parity information using any matching schema.

According to another aspect, there may be a provision for the parity information to be buffered for a specified period of time that is in particular dependent on a coherence time of the communication channel in order to obtain less correlated samples.

According to another aspect, there may be a provision for the second communication node, in a second iteration following the first iteration, to decode the parity information of the first sample following the quantization, while the first communication node encodes the parity information of the second sample, then to transmit a confirmation via the communication channel to the first communication node, and for the first communication node, in response to the confirmation, to transmit the parity information of the second sample via the communication channel to the second communication node. It is thus possible to assign tasks that are more computationally intensive such as decoding to the more powerful communication partner. Here it must be noted that, depending on the variant of the encoding or matching schema, the encoding and decoding normally do not have the same computing time requirement. In a heterogeneous installation, for example having a star topology, in which the central node is formed by a powerful base station, which communicates with one or multiple resource-limited sensor nodes, this specific embodiment of the present invention makes it possible for one node always to perform the encoding and the other node always to perform the decoding. It is thus possible for the protocol to be adapted to the computational limits of a specific system.

Since some systems, for example in homogeneous installations, nonetheless do not have such limitations or even assume a more balanced computational complexity, there may be, according to another aspect, a provision for the second communication node to decode the parity information of the first sample in a second iteration following the first iteration, to encode the parity information of the second sample following the quantization, and to transmit, in response to a ready signal, the parity information of the second sample via the communication channel to the first communication node.

Due to a higher number of transmissions, interactive matching protocols have the reputation of being time-consuming for resource-limited devices. The novel schema utilizes these additional transmissions in a practical manner and consequently makes these potentially more effective protocols acceptable for such devices. According to another aspect, therefore, a corresponding device may be provided that is designed to implement a method according to the present invention.

BRIEF DESCRIPTION OF THE DRAWINGS

Exemplary embodiments of the present invention are shown in the figures and are explained in more detail below.

DETAILED DESCRIPTION OF EXAMPLE EMBODIMENTS

Figure 1:
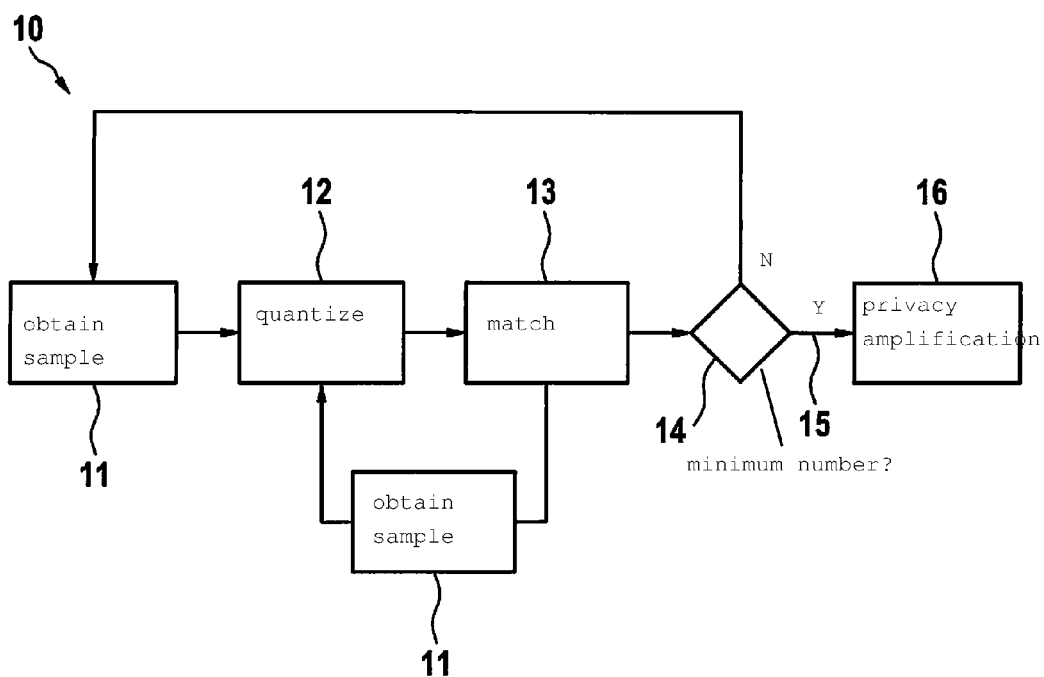
FIG. 1 shows a flow chart of a method according to a first specific embodiment

FIG. 1 illustrates in simplified fashion the extension of the key generation process in accordance with the present invention. Following the first acquisition of a sample $m_0$ by measurement 11 of the channel, an item of parity information is calculated using any desired matching schema and is transmitted by the first communication node—in the following: "Alice"—to the second communication node—in the following: "Bob"—, where it is buffered for a certain time. Subsequently, a second sample $m_1$ is obtained, as is conventionally done in connection with the channel measurement. Alice then calculates the parity information of $m_1$, while Bob decodes $m_0$ with the aid of the previous parity information. After some time has passed—again in order to influence the correlation of successive channel probes—, Bob confirms the successful decoding and Alice responds by transmitting the previously calculated parity information $m_1$. These messages are now used in order to probe the channel anew so as to obtain $m_2$. This is possible if the transmitted packets contain some parts such as packet headers that are known to the receiver. The process is continued until the required quantity of samples is reached. The match of the generated sequences $m_{Alice}=m_0|m_1|\ldots|m_x$ and $m_{Bob}=m_0|m_1|\ldots|m_x$ may be confirmed for example by exchanging the functional values of a hash function.

According to an alternative schema, the encoding and decoding are performed by only one node—for example Bob—and are performed by the other node—Alice—in the next iteration.

Figure 2:
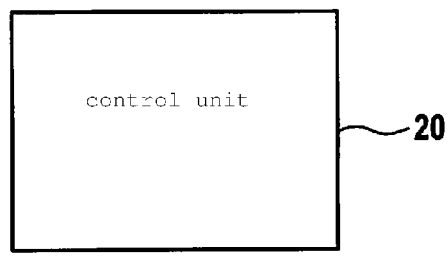
FIG. 2 shows in schematic fashion, a control unit according to a second specific embodiment.

This method 10 may be implemented for example in software or in hardware or in a mixed form of software and hardware for example in a control unit 20, as illustrated in the schematic representation of FIG. 2.

What is claimed is:

1. A method for generating a secret key via a reciprocal communication channel connecting a first communication node and a second communication node, the method comprising:
    obtaining, by the first communication node, a first sample by a measurement of the communication channel;
    performing, by the first communication node, a quantization of the first sample;
    performing, by the first communication node, a matching of the quantized sample with the second communication node via the communication channel;
    obtaining and quantizing, by the first communication node, a second sample, during the matching, by a second measurement of the communication channel;
    obtaining, by the communication nodes, the key from the samples by a privacy amplification;
    encoding, by the first communication node, an item of parity information of the respective sample in a first iteration following the quantization;
    transmitting, by the first communication node, the parity information to the second communication node via the communication channel;
    in a second iteration following the first iteration, decoding, by the second communication node, the parity information of the first sample following the quantization, while the first communication node encodes the parity information of the second sample;
    following the decoding, transmitting, by the second communication node, a confirmation via the communication channel to the first communication node; and
    in response to the confirmation, transmitting, by the first communication node, the parity information of the second sample via the communication channel to the second communication node.

2. The method as recited in claim 1, further comprising:
    obtaining and quantizing, by the first communication node, additional samples over multiple iterations;
    comparing, by the first communication node, a number of samples following the matching to a specified minimum number, wherein the privacy amplification occurs only when a minimum number has been reached.

3. The method as recited in claim 1, wherein the parity information is buffered in each iteration over a specified period of time that is dependent on a coherence time of the communication channel.

4. The method as recited in claim 2, further comprising:
    when the minimum number is reached, validating, by the first communication node and the second communication node, using a one-way hash function, via the communication channel.

5. A non-transitory machine-readable storage medium storing a computer program for generating a secret key via a reciprocal communication channel connecting a first communication node and a second communication node, the computer program, when executed by a processor, causing the processor to perform:
    obtaining, by the first communication node, a first sample by a measurement of the communication channel;
    performing, by the first communication node, a quantization of the first sample;
    performing, by the first communication node, a matching of the quantized sample with the second communication node via the communication channel;
    obtaining and quantizing, by the first communication node, a second sample, during the matching, by a second measurement of the communication channel;

obtaining the key from the samples by a privacy amplification;

encoding, by the first communication node, an item of parity information of the respective sample in a first iteration following the quantization;

transmitting, by the first communication node, the parity information to the second communication node via the communication channel;

in a second iteration following the first iteration, decoding, by the second communication node, the parity information of the first sample following the quantization, while the first communication node encodes the parity information of the second sample;

following the decoding, transmitting, by the second communication node, a confirmation via the communication channel to the first communication node; and in response to the confirmation, transmitting, by the first communication node, the parity information of the second sample via the communication channel to the second communication node.

6. A device configured to generate a secret key via a reciprocal communication channel connecting a first communication node and a second communication node, the device configured to:

obtain a first sample by a measurement of the communication channel;

perform a quantization of the first sample;

perform a matching of the quantized sample with the second communication node via the communication channel;

obtain and quantize a second sample, during the matching, by a second measurement of the communication channel;

obtain the key from the samples by a privacy amplification;

encode an item of parity information of the respective sample in a first iteration following the quantization;

transmit by the first communication node, the parity information to the second communication node via the communication channel;

in a second iteration following the first iteration, decode, by the second communication node, the parity information of the first sample following the quantization, while the first communication node encodes the parity information of the second sample;

following the decoding, transmit, by the second communication node, a confirmation via the communication channel to the first communication node; and in response to the confirmation, transmit, by the first communication node, the parity information of the second sample via the communication channel to the second communication node.

7. A method for generating a secret key via a reciprocal communication channel connecting a first communication node and a second communication node, the method comprising:

obtaining, by the first communication node, a first sample by a measurement of the communication channel;

performing, by the first communication node, a quantization of the first sample;

performing, by the first communication node, a matching of the quantized sample with the second communication node via the communication channel;

obtaining and quantizing, by the first communication node, a second sample, during the matching, by a second measurement of the communication channel;

obtaining, by the communication nodes, the key from the samples by a privacy amplification;

encoding, by the first communication node, an item of parity information of the respective sample in a first iteration following the quantization;

transmitting, by the first communication node, the parity information to the second communication node via the communication channel;

in a second iteration following the first iteration, decoding, by the second communication node, the parity information of the first sample, and encoding the parity information of the second sample following the quantization; and in response to a ready signal, transmitting, by the second communication node, the parity information of the second sample via the communication channel to the first communication node.

8. A non-transitory machine-readable storage medium storing a computer program for generating a secret key via a reciprocal communication channel connecting a first communication node and a second communication node, the computer program, when executed by a processor, causing the processor to perform:

obtaining, by the first communication node, a first sample by a measurement of the communication channel;

performing, by the first communication node, a quantization of the first sample;

performing, by the first communication node, a matching of the quantized sample with the second communication node via the communication channel;

obtaining and quantizing, by the first communication node, a second sample, during the matching, by a second measurement of the communication channel;

obtaining the key from the samples by a privacy amplification;

encoding, by the first communication node, an item of parity information of the respective sample in a first iteration following the quantization;

transmitting, by the first communication node, the parity information to the second communication node via the communication channel;

in a second iteration following the first iteration, decoding, by the second communication node, the parity information of the first sample, and encoding the parity information of the second sample following the quantization; and in response to a ready signal, transmitting, by the second communication node, the parity information of the second sample via the communication channel to the first communication node.

9. A device configured to generate a secret key via a reciprocal communication channel connecting a first communication node and a second communication node, the device configured to:

obtain a first sample by a measurement of the communication channel;

perform a quantization of the first sample;

perform a matching of the quantized sample with the second communication node via the communication channel;

obtain and quantize a second sample, during the matching, by a second measurement of the communication channel;

obtain the key from the samples by a privacy amplification;

encode an item of parity information of the respective sample in a first iteration following the quantization;

transmit by the first communication node, the parity information to the second communication node via the communication channel;

in a second iteration following the first iteration, decode, by the second communication node, the parity information of the first sample, and encode the parity information of the second sample following the quantization; and in response to a ready signal, transmit, by the second communication node, the parity information of the second sample via the communication channel to the first communication node.

\* \* \* \* \*